United States Patent
Hornych et al.

(10) Patent No.: US 9,779,629 B2
(45) Date of Patent: Oct. 3, 2017

(54) OBSTACLE ADVISORY SYSTEM

(71) Applicant: HONEYWELL INTERNATIONAL INC., Morris Plains, NJ (US)

(72) Inventors: Petr Hornych, Nove Mesto nad Metuji (CZ); Tomas Kabrt, Pragu (CZ); Patricia May Ververs, Ellicott City, MD (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 72 days.

(21) Appl. No.: 14/928,679

(22) Filed: Oct. 30, 2015

(65) Prior Publication Data

US 2017/0124887 A1 May 4, 2017

(51) Int. Cl.
  *B60R 1/00* (2006.01)
  *G08G 5/04* (2006.01)
  *G08G 9/02* (2006.01)

(52) U.S. Cl.
  CPC .................. *G08G 5/04* (2013.01); *G08G 9/02* (2013.01)

(58) Field of Classification Search
  CPC combination set(s) only.
  See application file for complete search history.

(56) References Cited

U.S. PATENT DOCUMENTS

| | | | |
|---|---|---|---|
| 4,635,030 A | 1/1987 | Rauch | |
| 7,375,678 B2 | 5/2008 | Feyereisen et al. | |
| 7,908,045 B1 | 3/2011 | McCusker | |
| 8,249,762 B1 | 8/2012 | Flotte et al. | |
| 8,676,431 B1 | 3/2014 | Mariet et al. | |
| 9,100,554 B2 | 8/2015 | Barth | |
| 2003/0076415 A1* | 4/2003 | Strumolo | B60R 1/00 348/149 |
| 2008/0231703 A1* | 9/2008 | Nagata | H04N 7/181 348/148 |
| 2012/0154175 A1* | 6/2012 | Bandou | G08G 1/164 340/905 |
| 2014/0062755 A1 | 3/2014 | Kabrt et al. | |

FOREIGN PATENT DOCUMENTS

| | | |
|---|---|---|
| EP | 2672289 A1 | 12/2013 |
| EP | 2891900 A1 | 7/2015 |

OTHER PUBLICATIONS

Extended European Search Report for Application No. 16195168.6-1812 dated Mar. 28, 2017.

\* cited by examiner

*Primary Examiner* — Brian Zimmerman
*Assistant Examiner* — Cal Eustaquio
(74) *Attorney, Agent, or Firm* — Lorenz & Kopf, LLP (57) ABSTRACT

An obstacle advisory system for a vehicle and a method for operating the same are provided. The system, for example, may include, but is not limited to a display, and a processor communicatively coupled to the display, the processor configured to receive sensor data from at least one sensor configured to sense obstacles around a vehicle, generate obstacle display data based upon the sensor data, the obstacle display data comprising display data for each of a plurality of sectors and for each of a plurality of blocks within each of the plurality of sectors forming a grid surrounding the vehicle, and display the generated obstacle display data on the display.

20 Claims, 8 Drawing Sheets

OBSTACLE ADVISORY SYSTEM

TECHNICAL FIELD

The present disclosure generally relates to vehicles, and more particularly relates to warning systems for vehicles.

BACKGROUND

Helicopter landing, takeoff and near-ground maneuvering can be one of the more challenging aspects of piloting a helicopter. Accordingly, systems for aiding pilots during landing, takeoff and near-ground maneuvering are desirable.

BRIEF SUMMARY

In one embodiment, for example, an obstacle advisory system is provided. The system may include, but is not limited to, a display, and a processor communicatively coupled to the display, the processor configured to receive sensor data from at least one sensor configured to sense obstacles around a vehicle, generate obstacle display data based upon the sensor data, the obstacle display data comprising display data for each of a plurality of sectors and for each of a plurality of blocks within each of the plurality of sectors forming a grid surrounding the vehicle, and display the generated obstacle display data on the display.

In another embodiment, for example, a method of operating an obstacle advisory system is provided. The method may include, but is not limited to, receiving, by a processor, sensor data from at least one sensor configured to sense obstacles around a vehicle, generating, by the processor, obstacle display data based upon the sensor data, the obstacle display data comprising display data for each of a plurality of sectors and for each of a plurality of blocks within each of the plurality of sectors forming a grid surrounding the vehicle, and displaying the generated obstacle display data on a display.

In another embodiment, for example, a vehicle is provided. The vehicle may include, but is not limited to a plurality of sensors configured to collect sensor data indicating when an obstacle is within a range of the vehicle, each of the plurality of sensors arranged to collect the sensor data in a different direction around the vehicle, a display, and a processor communicatively coupled to the plurality of sensors and the display, the processor configured to receive sensor data from the plurality of sensors, generate obstacle display data based upon the sensor data, the obstacle display data comprising display data for each of a plurality of sectors and for each of a plurality of blocks within each of the plurality of sectors forming a grid surrounding the vehicle, and display the generated obstacle display data on the display.

BRIEF DESCRIPTION OF THE DRAWINGS

The detailed description will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

An obstacle advisory system for a vehicle and a method for operating obstacle advisory system are discussed herein. The obstacle advisory system provides a simplified display to the operator of the vehicle warning the operator of possible obstacles the vehicle may encounter.

Figure 1:
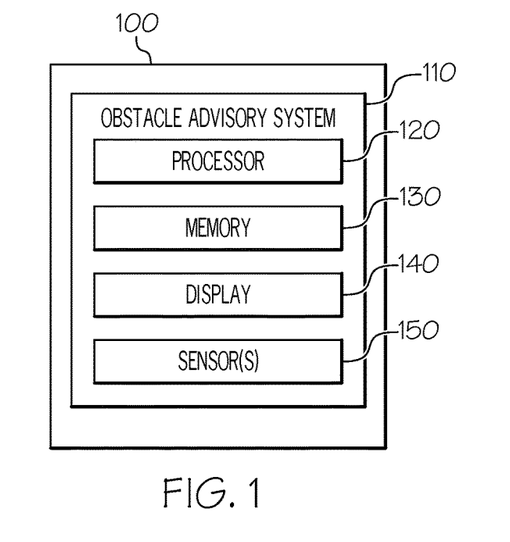
FIG. 1 is a block diagram of a vehicle having an exemplary obstacle advisory system, in accordance with an embodiment.

FIG. 1 is a block diagram of a vehicle 100 having an exemplary obstacle advisory system 110, in accordance with an embodiment. In one embodiment, for example, the vehicle 100 may be a helicopter. However, other vehicles 100 such as aircraft, spacecraft, watercraft, automobiles or any other type of moving vehicle could also utilize the obstacle advisory system 110.

The obstacle advisory system 110 includes a processor 120. The processor 120 may be a central processing unit (CPU), a graphics processing unit (GPU), a field programmable gate array (FPGA), an application specific integrated circuit (ASIC), a microcontroller, or any other logic device or combination thereof. As discussed in further detail below, the processor 120 controls the operation of the obstacle advisory system 110. In one embodiment, the processor 120 may be dedicated to the obstacle advisory system 110. However, in other embodiments, for example, the processor 120 may be utilized by one or more other systems in the vehicle 100.

The obstacle advisory system 110 includes a memory 130. The memory 130 may be any combination of volatile and non-volatile memories. The memory 130 may store non-transitory computer-readable instructions, which when executed by the processor 120, implement the obstacle advisory system 110, as discussed in further detail below. In the embodiment illustrated in FIG. 1, the memory 130 is located in the vehicle 100. However, in other embodiments, the memory 130 may be located remotely from the vehicle 100, such as a cloud based memory. In this embodiment, the processor 120 of the obstacle advisory system 110 may communicate with the memory 130 via a communication system (not illustrated in FIG. 1).

The obstacle advisory system 110 includes a display 140. The display 140 may be a liquid crystal display (LCD), a cathode ray tube (CRT) display, an organic light emitting diode (OLED) display, a plasma display or any other type of display. As discussed in further detail below, the processor 120 of the obstacle advisory system 110 generates obstacle advisory display data and outputs the obstacle advisory display data to the display 140 to warn users of the vehicle 100 of obstacles.

The obstacle advisory system 110 further includes one or more sensors 150. Preferably, the obstacle advisory system 110 includes enough sensors to gather data in every direction around the vehicle 100. However, if data from sensors 150 are not needed from every direction, fewer sensors 150 could be used. The sensors 150 maybe be any combination of radar, lidar, ladar, 3-D stereo optical or infrared cameras, ultrasonic sensors, Doppler sensors, or the like. In one embodiment, for example, multiple sensors 150 may be arranged on the vehicle 100 to collect data in the same area around the vehicle. The processor 120 may use data fusion to generate obstacle display data based upon data from multiple sensors for a sector, as discussed in further detail below, or actual sensor performance post-processing to determine which of the multiple sensors 150 arranged to collect data from the same sector to utilize when generating the obstacle display data.

In the embodiment illustrated in FIG. 1, the obstacle advisory system 110 is integrated into the vehicle. However, the obstacle advisory system 110 could also be a stand-alone system brought into the vehicle 100 as illustrated in FIG. 2.

Figure 2:
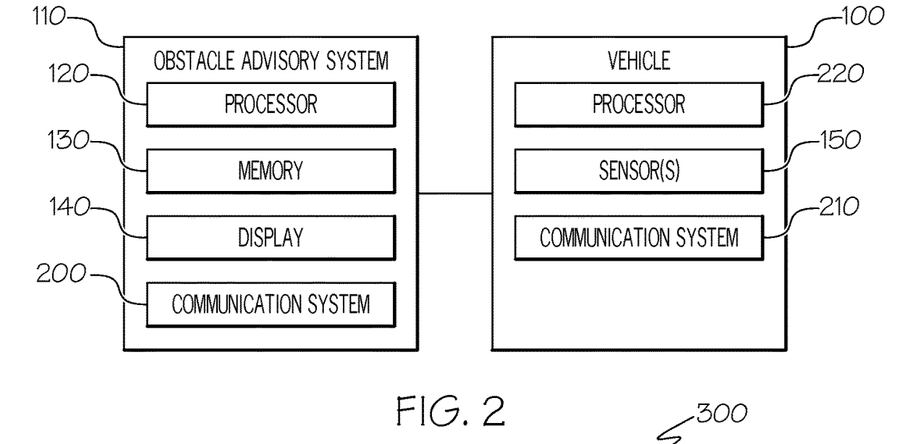
FIG. 2 is a block diagram of another exemplary obstacle advisory system 110, in accordance with an embodiment.

FIG. 2 is a block diagram of another exemplary obstacle advisory system 110, in accordance with an embodiment. In the embodiment illustrated in FIG. 2, the obstacle advisory system 110 may be a tablet, a cell phone, a laptop computer, or any other portable electronic device that could be carried into the vehicle 100. The obstacle advisory system 110 includes the processor 120, memory 130 and display 140 as discussed above.

The obstacle advisory system 110 illustrated in FIG. 2 further includes a communication system 200. The communication system 200 may be any wired or wireless communication system, including, but not limited to, a cellular communication system, a Wi-Fi communication system, a Bluetooth communication system, a ZigBee communication system, a local area network (LAN) communication system, or the like, or any combination thereof.

The processor 120 of the obstacle advisory system 110 communicates with a communication system 210 of the vehicle 100. The communication system 210 of the vehicle could also include any wired or wireless communication system, or a combination thereof. In the embodiment illustrated in FIG. 2, the vehicle 100 includes a processor 220. The processor 220 may be a central processing unit (CPU), a graphics processing unit (GPU), a field programmable gate array (FPGA), an application specific integrated circuit (ASIC), a microcontroller, or any other logic device or combination thereof. The processor 220 receives data from the sensor(s) 150 and transmits the sensor data to the obstacle advisory system 110 for display on the display 140 of the obstacle advisory system 110, as discussed in further detail below.

Figure 3:
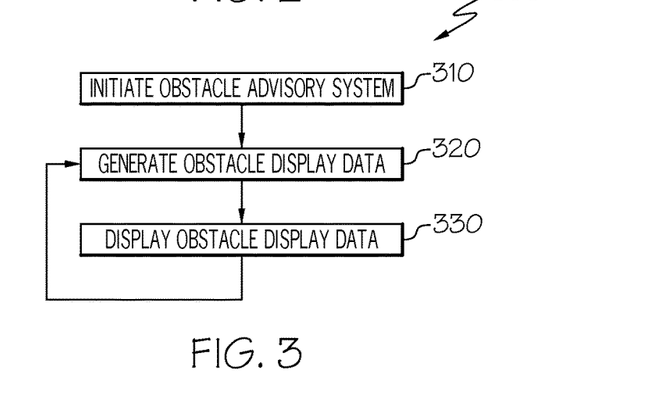
FIG. 3 is a flow diagram illustrating a method for operating an obstacle advisory system, in accordance with an embodiment.

FIG. 3 is a flow diagram illustrating a method 300 for operating an obstacle advisory system 110, in accordance with an embodiment. The method begins when the obstacle advisory system 110 is initiated. (Step 310). In one embodiment, for example, the obstacle advisory system 110 may be automatically initiated. For example, if a processor 220 of the vehicle 100, such as one part of a flight management system (not illustrated), determines that the vehicle 100 is in a landing phase or that the vehicle is within a predetermined distance to the ground, the processor 220 may send a signal to the processor 120 of the obstacle advisory system 110 to initiate the obstacle advisory system 110. In another embodiment, for example, the obstacle advisory system 110 may be initiated any time the vehicle 100 is in motion. However, the display 140 of the obstacle advisory system 110 may not display obstacle data unless the vehicle 100 is within a predetermined distance to the ground or the sensor data from the sensor(s) 150 indicate that an obstacle is within a predetermined distance of the vehicle. In yet another embodiment, for example, the obstacle advisory system 110 could be initiated manually by a user. When the obstacle advisory system is initiated, the processor 120 may begin receiving sensor data from sensors 150 if the processor was not already receiving the sensor data.

Figure 4:
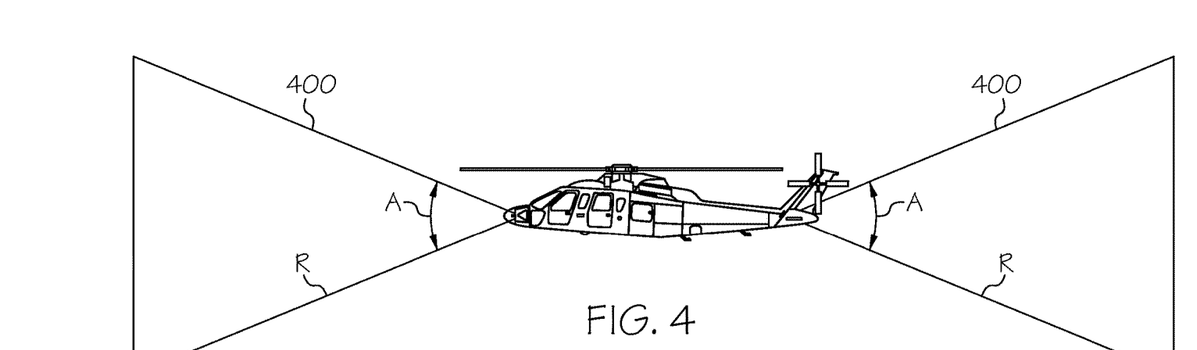
FIG. 4 is a diagram illustrating an exemplary sensor range, in accordance with an embodiment.

The processor 120 of the obstacle advisory system 110 then begins analyzing data from the sensors to generate obstacle display data. (Step 320). As discussed above, the sensor(s) 150 of the obstacle advisory system 110 transmit sensor data to the processor 120 either directly or through a communication system 210. The sensor(s) 150 collect data on any obstacle within the range of the respective sensor 150. FIG. 4 is a diagram illustrating an exemplary sensor range 400, in accordance with an embodiment. As seen in FIG. 4, the sensor range 400 (not drawn to scale) extends a distance R from the vehicle 100 and includes data on obstacles within an angle A over the distance R. The distance R and angle A of the sensor range 400 may be selected by choosing sensor(s) with different capabilities. However, in one embodiment, for example, the sensor range may be selectable by a user. In other words, an operator of the obstacle advisory system 110 could select a distance R and/or angle A of the sensor range 400 and only analyze data within the user defined range.

Returning to FIG. 3, the processor generates the obstacle display data based upon the sensor data. The obstacles could be buildings, trees, people, telephone/power poles, other vehicles or any other object which could pose a danger to the vehicle. In one embodiment, for example, the generated obstacle display data may be arranged in a grid pattern.

Figure 5:
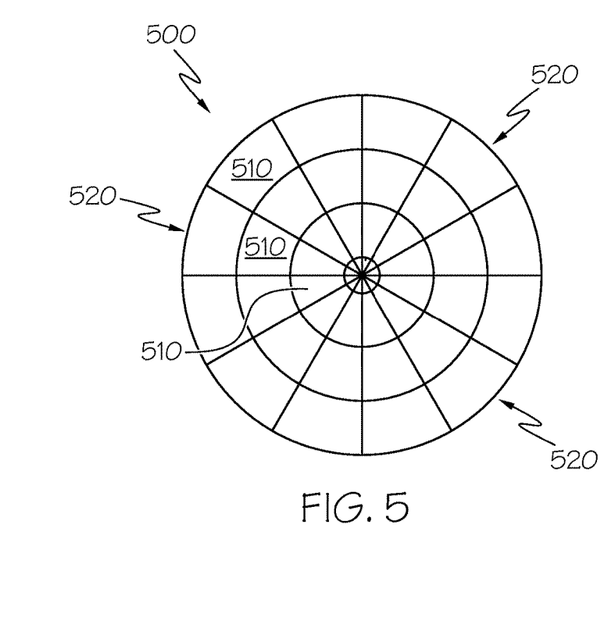
FIG. 5 illustrates an exemplary grid, in accordance with an embodiment.

FIG. 5 illustrates an exemplary grid 500, in accordance with an embodiment. As seen in FIG. 5, the grid 500 is constructed from a series of concentric circles and radial lines radiating from the center of the circles. However, a wide variety of grids could be used to display the obstacle display data. For example, an elliptical shaped grid based upon a vehicle envelope could be utilized, triangular grids, or grids in any other two or three-dimensional shape could be utilized. As discussed in further detail below, display data may be generated by the processor 120 for each block 510 in the grid 500 and/or each sector 520 of the grid. In the embodiment illustrated in FIG. 5, each sector 520 is a group of grid blocks 510 radiating in the same direction.

Figure 6:
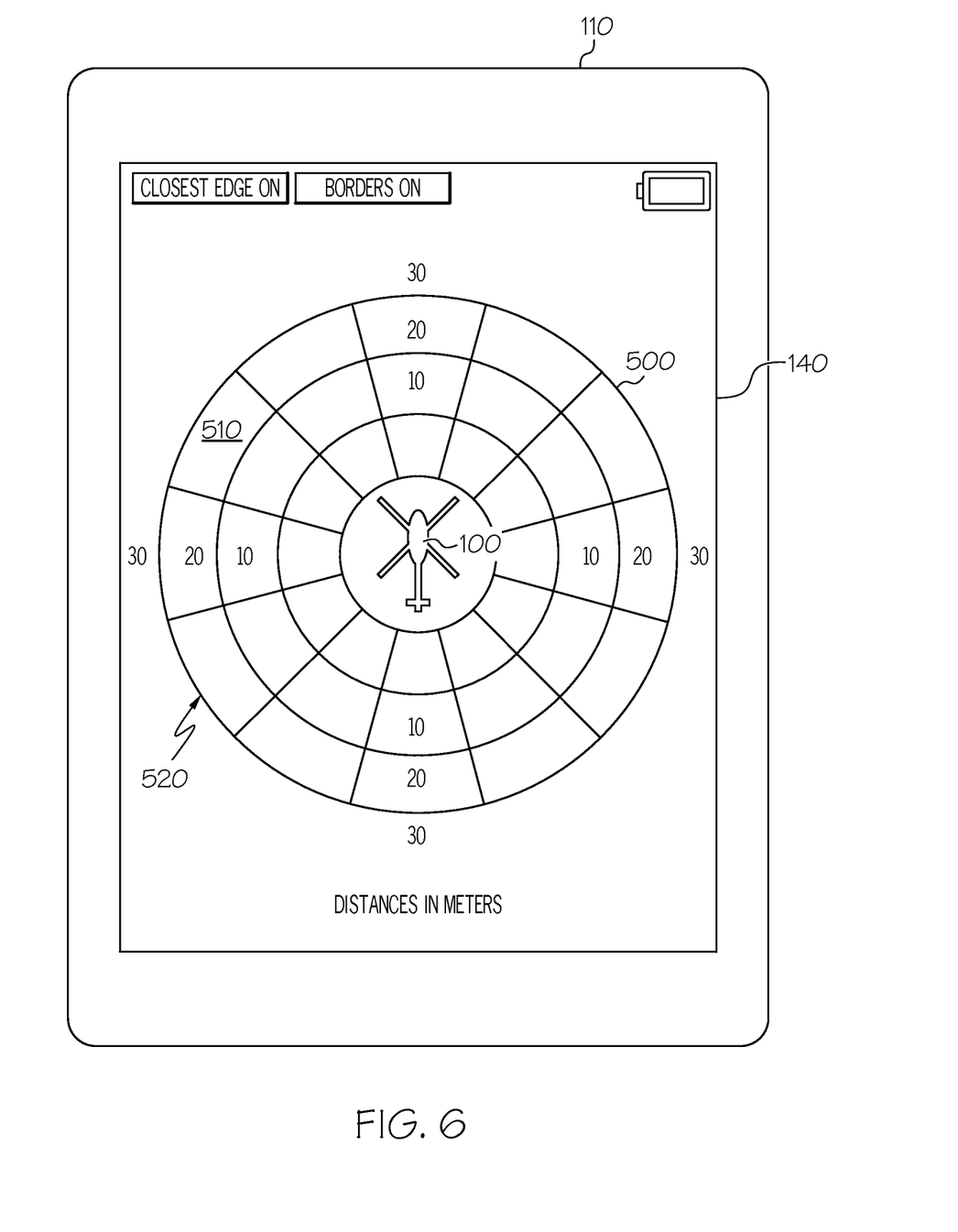
FIG. 6 illustrates an exemplary obstacle advisory system displaying obstacle display data generated in Step, in accordance with an embodiment.

FIG. 6 illustrates an exemplary obstacle advisory system 110 displaying obstacle display data generated in Step 320, in accordance with an embodiment. While the obstacle advisory system 110 is illustrated as a tablet in FIG. 6, the obstacle advisory system 110 could any portable electronic device or may be integrated into a vehicle 100, as discussed above. As seen in FIG. 6, the obstacle display data 600 generated by the processor 120 is generates as a grid 500 having a variety of blocks 510 and sectors 520. The vehicle 100, a helicopter in this embodiment, is illustrated at the center of the grid 500 is drawn to scale relative to the grid 500. In other words, the distance between each grid block 510 may be a fixed distance, illustrated as ten meters in FIG. 6, and the vehicle is drawn to scale relative to the grid marks.

As seen in FIG. 6, any obstacle within the inner circle would be less than ten meters from the vehicle 100, any obstacle between the inner circle and the middle circle is between ten and twenty meters of the vehicle 100, any obstacle between the middle circle and the outer circle is between twenty and thirty meters of the vehicle 100, and anything beyond the outer circle is at least thirty meters from the vehicle 100. However, the distance each circle represents and the number of circles may vary depending upon a user desired granularity or an attribute of the vehicle 100. In one embodiment, for example, the distance each circle represents may be dependent upon the size of the vehicle 100 or a component of a vehicle 110, such as a main rotor size. In the embodiment illustrated in FIG. 6, the helicopter main rotor has a diameter of twenty meters. In this embodiment, the distance each circle represents is based upon a multiple of the rotor diameter, the multiple being 1.5, hence the outer circle having a distance of thirty meters. However, the multiple could be set at any desirable value.

The other circles, here a ten and twenty meter circle, are fractions of the outer circle, here two-thirds and one-third the distance of the outer circle. In other words, the distance represented by any inner circles is dependent upon the number of circles used. If four circles were selected, for example, each circle would represent one quarter of the distance of the outer circle.

The number of radial lines could also vary. In the embodiment illustrated in FIG. 6, twelve radial lines are used to create twelve sectors 520 and thirty-six grid blocks 510. However, any number of radials lines may be used dependent upon a desired granularity.

Returning to FIG. 3, the obstacle display data generated in step 320 may indicate an obstacle is within each block 510 of the grid 500 in one or more of the following ways. In one embodiment for example, processor 120 may indicate that an obstacle is within a sector 520 and block 510 of a grid 500 without indicating where the obstacle is, thus providing the necessary warning without cluttering the display 140.

Figure 7:
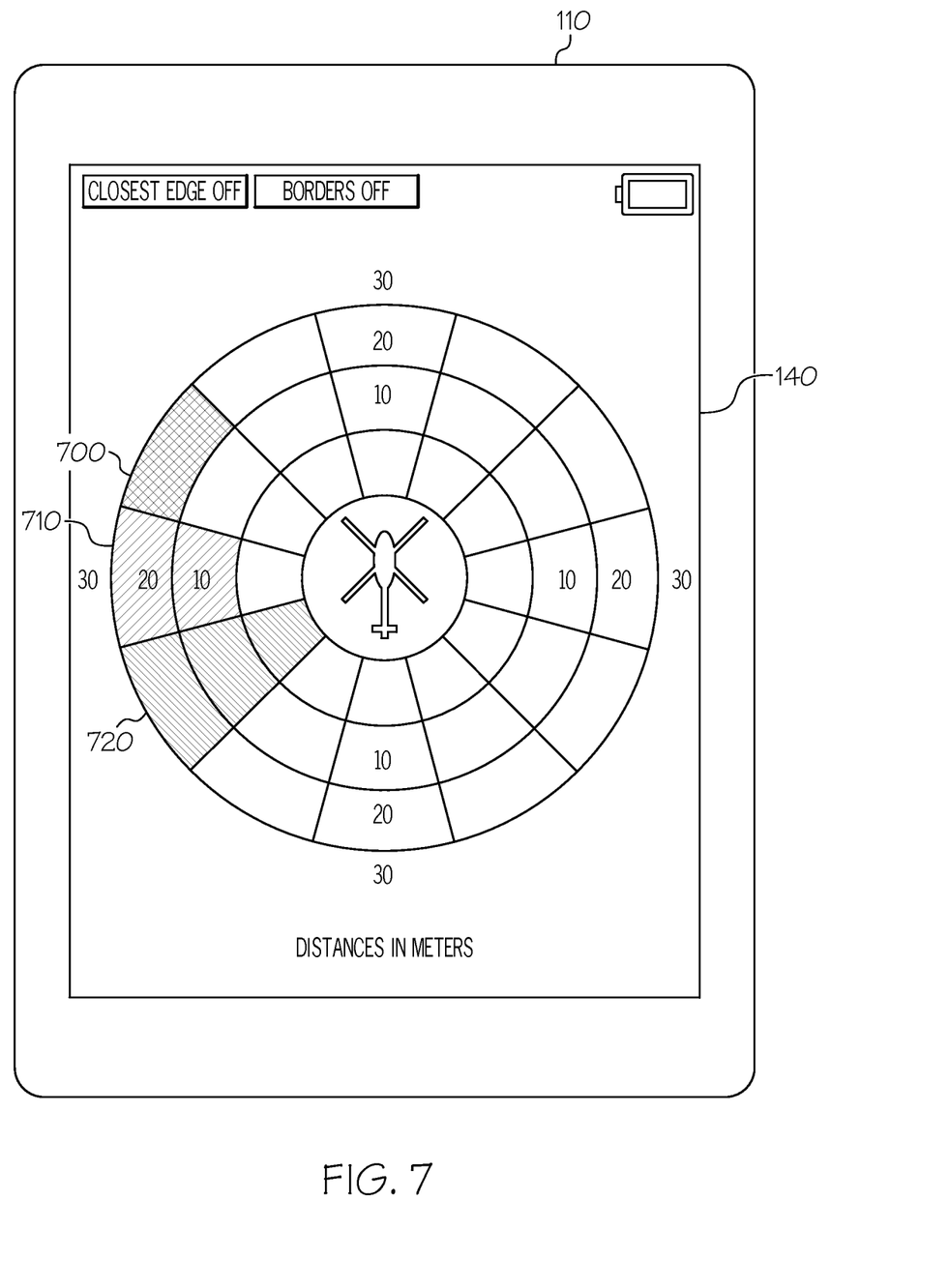
FIG. 7 illustrates another exemplary obstacle advisory system displaying obstacle display data generated in Step, in accordance with an embodiment.

FIG. 7 illustrates an exemplary obstacle advisory system 110 displaying obstacle display data generated in Step 320, in accordance with an embodiment. In this embodiment, one or more obstacles have been identified by the processor 120 in three sectors, 700, 710 and 720. The sector 700 has one grid block 510 indicated, indicating an obstacle is between twenty and thirty meters of the vehicle in the direction of the respective sector. The sector 710 has two grid blocks 510 indicated, indicating an obstacle is between ten and twenty meters of the vehicle in the direction of the respective sector. The sector 720 has three grid blocks 510 indicated, indicating an obstacle is less than ten meters from the vehicle 100 in the direction of the respective sector. As such, a vehicle operator can quickly look at the display 140 to see where the obstacles are relative to the vehicle. In operation, the processor during Step 320, would determine the appropriate obstacle display data for each grid block 510 and sector 520 of the grid 100 based upon the data from the sensor(s) 150. As illustrated in FIG. 7, the processor 120 determines the obstacle display data for each sector 520 based upon which grid blocks 510 within the sector includes obstacle data. In other words, the processor 120 generates identical obstacle display data for all outer grid blocks 510 when the inner grid block 510 of a sector 520 relative to the outer grid blocks 510 includes an obstacle. Accordingly, as seen in FIG. 7, the grid block 510 in each sector 520 having the closest obstacle to the vehicle dictates the obstacle display data generated for the outer grid blocks 510 relative to the closest grid block in which an obstacle is located.

As seen in FIG. 7, sectors 700, 710 and 720 are illuminated in different shades of gray. This can aid a vehicle operator in quickly determining in which sector 520 the closest obstacle is present. While not illustrated in FIG. 7, the processor 120 could also vary a color of the sectors. For example, sectors which have an obstacle in the closest grid block 510 to the vehicle could be presented in a bold color, such as red, while other sectors having obstacles further away may be presented in more muted colors. In another embodiment, for example, different patterns or opacities could be used to indicate the objects in different sectors.

Returning to FIG. 3, the processor 120 may provide additional details of where obstacles are located in obstacle display data generated in step 320. For example, the processor 120 may indicate where a closest edge of the obstacle is within a grid block 510.

Figure 8:
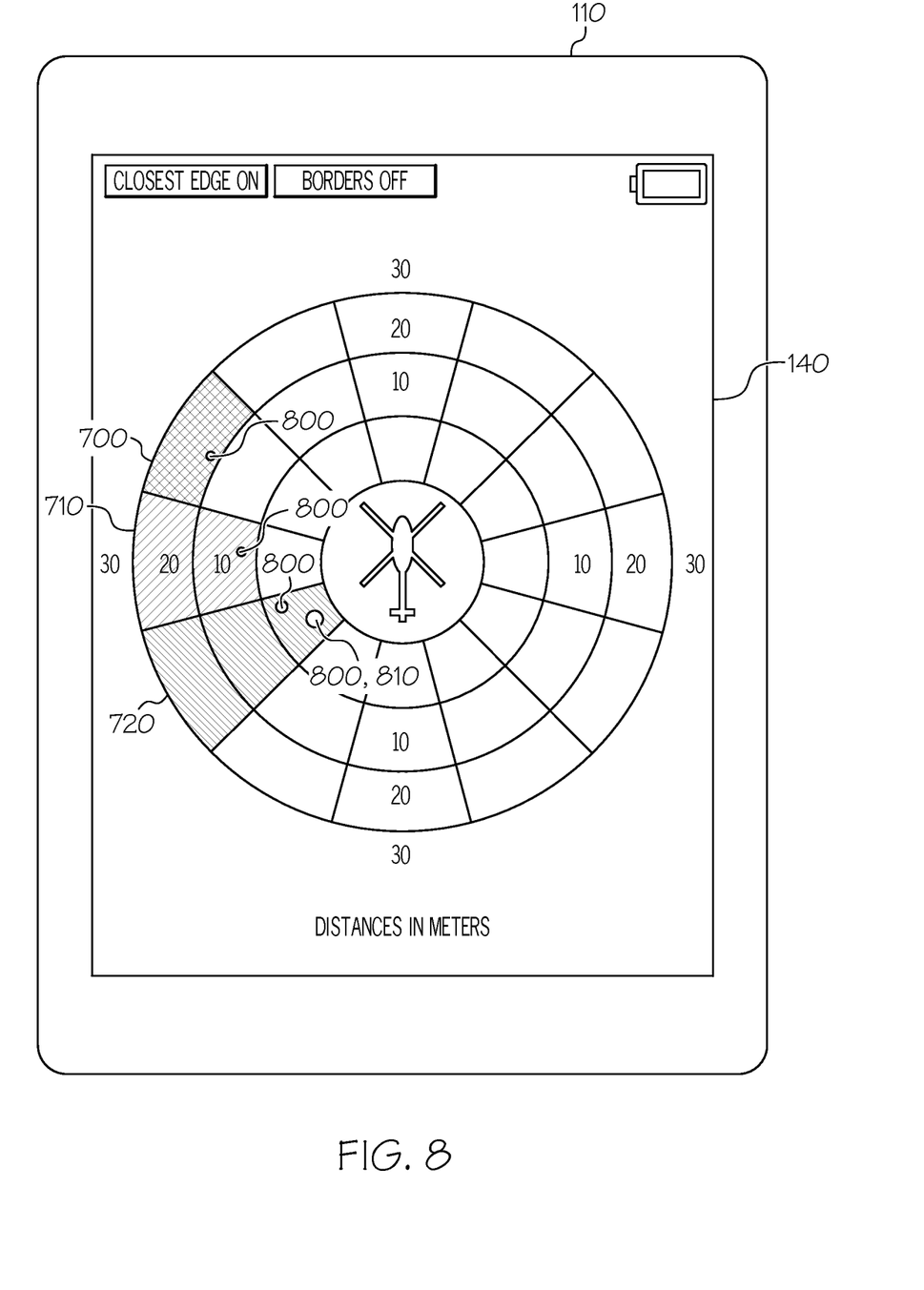
FIG. 8 illustrates yet another exemplary obstacle advisory system displaying obstacle display data generated in Step, in accordance with an embodiment.

FIG. 8 illustrates an exemplary obstacle advisory system 110 displaying obstacle display data generated in Step 320, in accordance with an embodiment. As seen in FIG. 8, the sectors, 700, 710 and 720 are visually indicated in a similar fashion as discussed in FIG. 7. Additionally, in each visually indicated sector, at least one obstacle edge 800 is identified. This provides the vehicle operator with additional granularity with respect to the obstacle(s) within each grid block 510. As discussed above, obstacles can include buildings, power poles, trees and any other obstacle that could pose a threat to the vehicle 100 or be damaged by the vehicle 100. Accordingly, the embodiment illustrated in FIG. 8 provides more granularity with respects to an objects closest edge within each grid block 510 without over cluttering the display 140 and distracting the operator. As illustrated in FIG. 8, one of the obstacle edges 800 may be indicated as a most hazardous obstacle 810 at a given time. In this embodiment, the most hazardous obstacle 810 is indicated with a larger dot than the other obstacle edges 800. However, the most hazardous obstacle 810 could be indicated in a variety of ways, including, but not limited to, a unique marker (i.e., marker shape), a marker of a unique color, or a combination thereof. The processor 120 may determine the most hazardous obstacle 810 based upon a distance between the object and the vehicle 100, a bearing of the vehicle 100, a height of the object relative to the vehicle 100, a closing rate between the object and the vehicle 100, an object type, or the like, or any combination thereof. Accordingly, while the edge of the object closest to the vehicle 100 is indicated as being the most hazardous object 810 in FIG. 8, if an object is moving, such as when the object is another vehicle, the processor 120 could indicate that objects further away from the vehicle are more hazardous based upon the factors indicated above.

Returning to FIG. 3, the processor 120 may provide additional details of where obstacles are located in obstacle display data generated in step 320. For example, the processor 120 may indicate where borders of an object are within a grid block 510.

Figure 9:
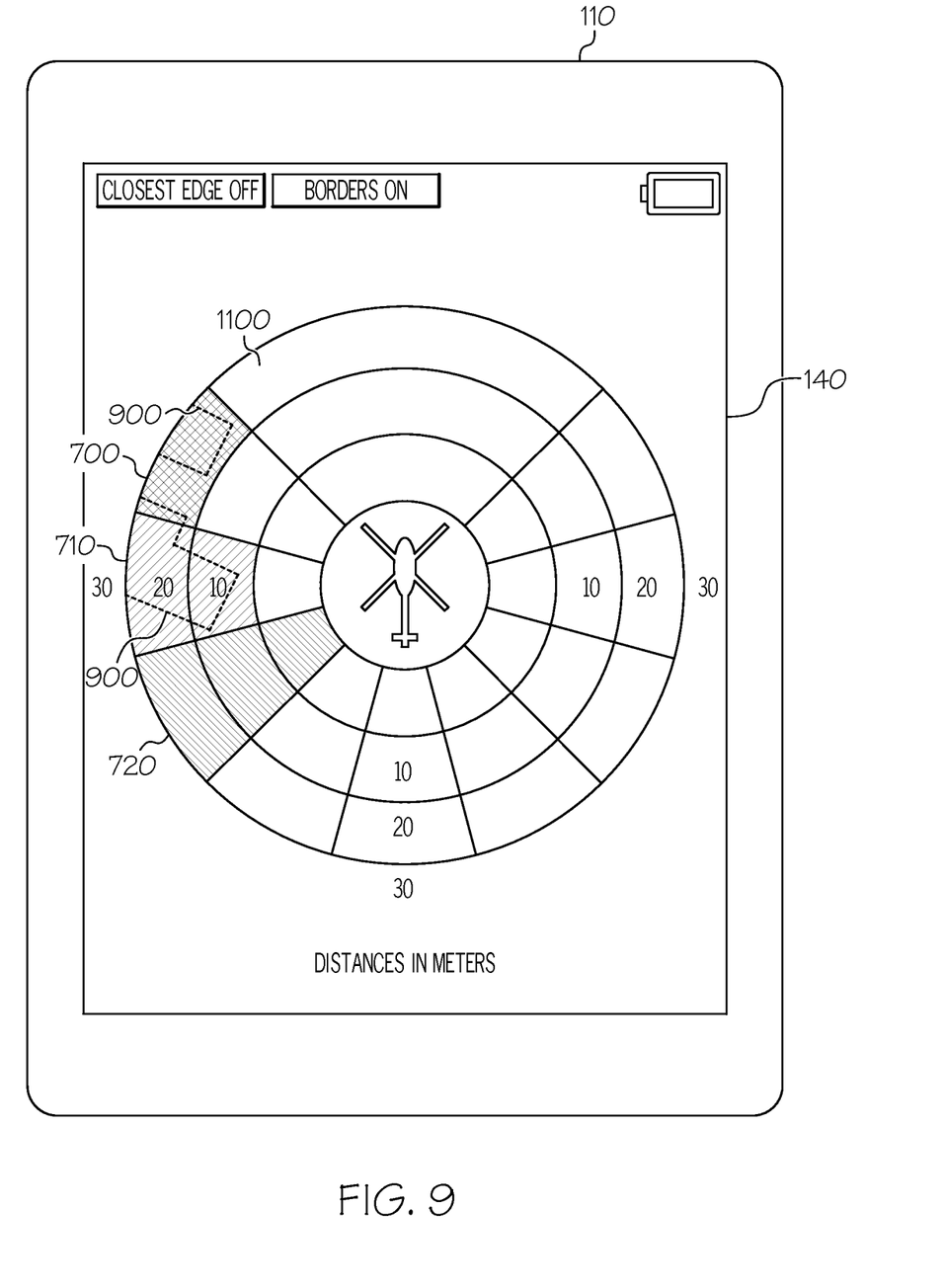
FIG. 9 illustrates another exemplary obstacle advisory system displaying obstacle display data generated in Step, in accordance with an embodiment.

FIG. 9 illustrates an exemplary obstacle advisory system 110 displaying obstacle display data generated in Step 320, in accordance with an embodiment. As seen in FIG. 9, the sectors, 700, 710 and 720 are visually indicated in a similar fashion as discussed in FIG. 7, providing a baseline for indicating where obstacles are relative to the vehicle 100. Additionally, in sectors 700 and 710 borders 900 of obstacles are provided. In this embodiment, for example, the processor 120, when generating the obstacle display data in Step 320, identifies when an obstacle or multiple obstacles near each other, extend over a predetermined length. The predetermined length can vary, depending upon a desired sensitivity. Accordingly, in the embodiment illustrated in FIG. 9, the processor 120 has identified at least one obstacle in sector 700 and at least one obstacle which extends into both sectors 700 and 720 which has an border over the predetermined length. Generally buildings may be identified as obstacles with borders over the predetermined length. However, if multiple trees, for example, or other obstacles are within a predetermined distance of each other, the processor may also identify multiple individual obstacles as having a common border. The predetermined distance can vary depending upon a desired granularity of the obstacle display data.

Figure 10:
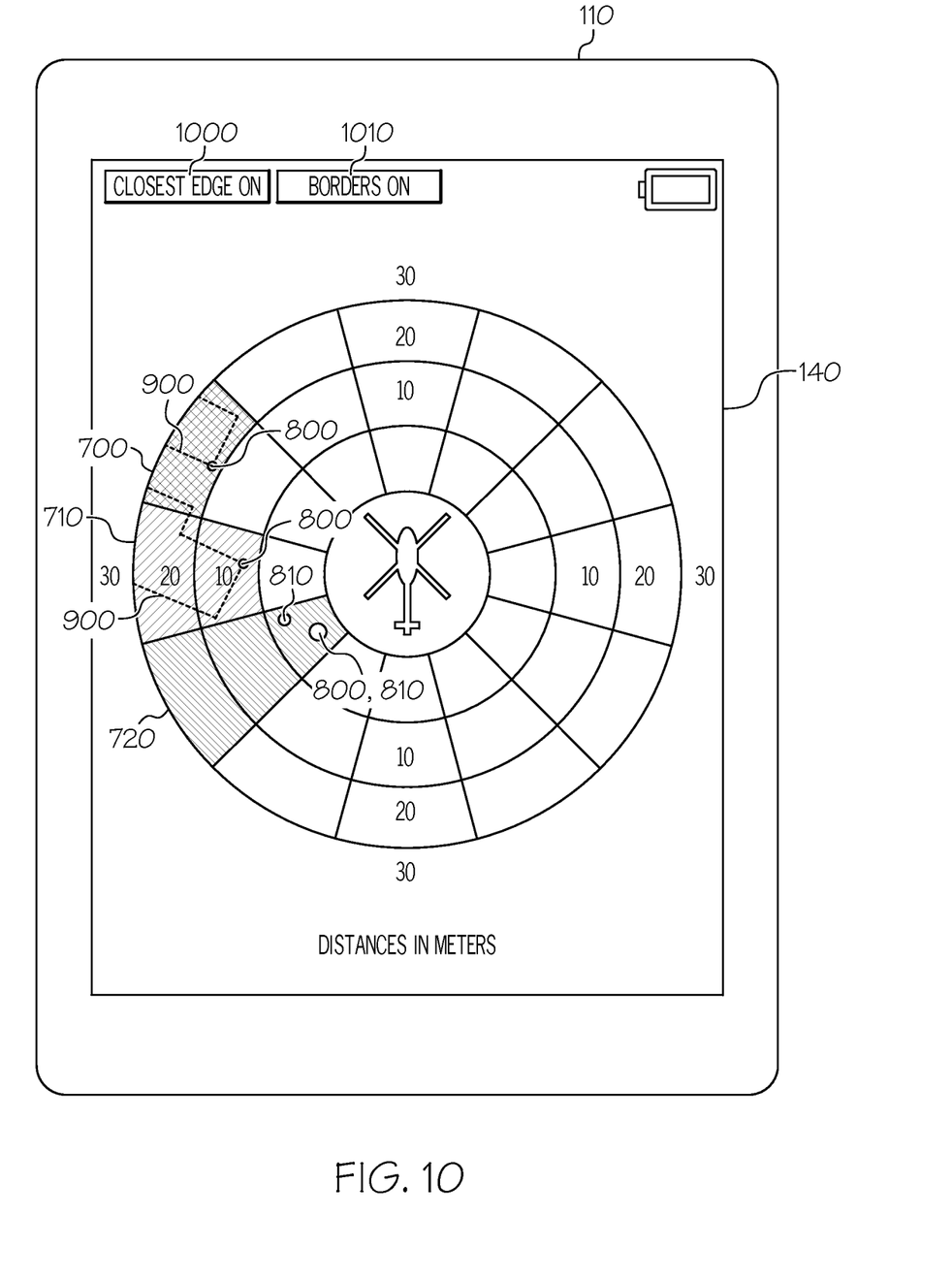
FIG. 10 illustrates yet another exemplary obstacle advisory system displaying obstacle display data generated in Step, in accordance with an embodiment.

The processor 120 may display any combination of the obstacle indicators when generating the obstacle data in Step 320. FIG. 10 illustrates an exemplary obstacle advisory system 110 displaying obstacle display data generated in Step 320, in accordance with an embodiment. As seen in FIG. 10, the processor 120 in this embodiment has generated identical obstacle display data for sectors 520 based upon which grid block 510 within the sector 520 an obstacle is present, as well as borders 900 of obstacles and indications of the closest edge 800 of obstacles. As seen in FIG. 10, as well as numerous other figures, the processor 120 may generate obstacle display data option interfaces 1000 and 1010. As illustrated in FIG. 10, an operator could interact with interface 1000 to turn on or off the closest edge data and could interact with interface 1010 to turn on or off the border data. In this embodiment, the identical obstacle display data for sectors 520, as discussed above, is a default display method that cannot be turned on or off. However, in other embodiments the borders 900 or closest edge 800 could be the default display option. In yet another embodiment, an operator may be able to turn on and off any of the obstacle display data indictors discussed herein.

Figure 11:
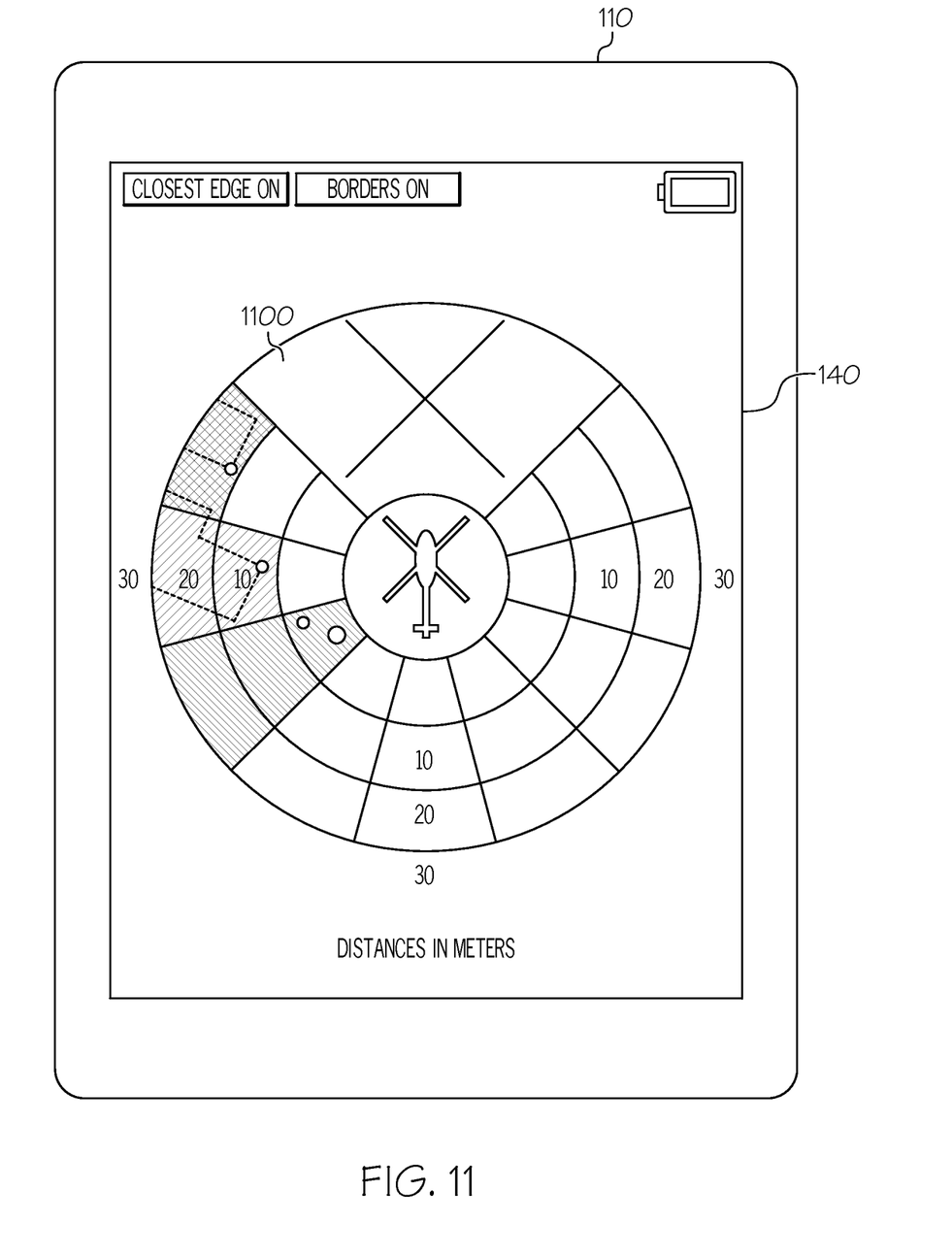
FIG. 11 illustrates another exemplary obstacle advisory system displaying obstacle display data generated in Step, in accordance with an embodiment.

Returning to FIG. 3, if the processor 120, when analyzing the sensor data in Step 320 determines that one or more sensors are malfunctioning, the processor may generate display data indicating the fault. FIG. 11 illustrates an exemplary obstacle advisory system 110 displaying obstacle display data generated in Step 320, in accordance with an embodiment. As seen in FIG. 11, the processor 120 generated display data 1100 (i.e., the crossed out sectors) indicating that one or more sensors 150 on the front of the vehicle is malfunctioning, preventing the respective sectors from having valid obstacle display data. While the embodiment illustrated in FIG. 11 illustrates the sectors without valid data by crossing out the respective sectors, the invalid sectors could be displayed in a variety of ways. The processor 120 may determine that the sensor(s) 150 are malfunctioning if the processor 120 is receiving no data from the respective sensor 150. Alternatively, if there are multiple sensors arranged to collect data for one or more sectors, the processor 120 may compare the sensor data from the respective sensors. If the sensor data does not match, the processor 120 may indicate that a fault is present, as illustrated in FIG. 11.

Returning to FIG. 3, once the display data is generated, the processor 120 outputs the display data to the display 140. (Step 330). The display protocol may vary depending upon the type of the display and the communication interface between the processor 120 and the display 140. The processor 120 then returns to Step 320 to update the display data based upon subsequent sensor data to provide real time obstacle advisory information to the operator of the vehicle.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An obstacle advisory system, comprising:
 a display; and
 a processor communicatively coupled to the display, the processor configured to:
  receive sensor data from at least one sensor configured to sense obstacles around a vehicle;
  determine when a single obstacle detected in the sensor data includes a border longer than a predetermined length;
  generate obstacle display data based upon the sensor data, the obstacle display data comprising display data for each of a plurality of sectors and for each of a plurality of blocks within each of the plurality of sectors forming a grid surrounding the vehicle, wherein when generating the obstacle display data, the processor is further configured to generate obstacle display data indicating the border of the single obstacle in one or more of the sectors; and
  display the generated obstacle display data on the display.

2. The obstacle advisory system of claim 1, wherein the processor is further configured to:
 determine, for each sector of the grid that includes indications of an obstacle in the sensor data, a closest block of the plurality of blocks of the respective sector closest to a center of the grid that includes the indications of the obstacle,
 wherein the processor, when generating the obstacle display data, is further configured to generate identical obstacle display data for the closest block of the plurality of blocks and each of the plurality of blocks in the respective sector of the grid further from the center of the grid than the closest block.

3. The obstacle advisory system of claim 1, wherein the processor is further configured to:
 determine when a plurality of obstacles detected in the sensor data are within a predetermined distance of each other; and determine, when the plurality of obstacles detected in the sensor data are within the predetermined distance, when a border length of the plurality of obstacles is greater than a predetermined length based upon the sensor data, wherein the processor, when generating the obstacle display data, is further configured to generate obstacle display data indicating a border of the plurality of obstacles in one or more of the sectors when the border length of the plurality of obstacles is greater than the predetermined length.

4. The obstacle advisory system of claim 1, wherein the processor is further configured to:

determine for each sector of the grid that includes indications of an obstacle in the sensor data, a closest edge of each obstacle in a closest block within the sector to the vehicle within the plurality of blocks of the respective sector, wherein the processor, when generating the obstacle display data, is further configured to generate obstacle display data indicating the closest edge of each obstacle in the closest block within the sector.

5. The obstacle advisory system of claim 1, wherein the grid comprises a plurality of circles and a plurality of radial lines extending from a center of the plurality of circles.

6. The obstacle advisory system of claim 5, wherein each sector includes the plurality of blocks between any two adjacent radial lines of the plurality of radial lines.

7. The obstacle advisory system of claim 1, wherein the display is integrated in the vehicle.

8. A method of operating an obstacle advisory system, comprising:

receiving, by a processor, sensor data from at least one sensor configured to sense obstacles around a vehicle;

determining, by the processor, when a single obstacle detected in the sensor data includes a border longer than a predetermined length;

generating, by the processor, obstacle display data based upon the sensor data, the obstacle display data comprising display data for each of a plurality of sectors and for each of a plurality of blocks within each of the plurality of sectors forming a grid surrounding the vehicle, the obstacle display data further indicating the border of the single obstacle in one or more of the sectors; and displaying the generated obstacle display data on a display.

9. The method of claim 8, wherein the generating further comprises further comprises:

determining, by the processor, for each sector of the grid that includes indications of an obstacle in the sensor data, a closest block of the plurality of blocks of the respective sector closest to a center of the grid that includes the indications of the obstacle; and generating, by the processor, identical obstacle display data for the closest block of the plurality of blocks and each of the plurality of blocks in the respective sector of the grid further from the center of the grid than the closest block.

10. The method of claim 8, further comprising:

determining, by the processor, when a plurality of obstacles detected in the sensor data are within a predetermined distance of each other;

determining, by the processor, when the plurality of obstacles detected in the sensor data are within the predetermined distance, when a border length of the plurality of obstacles is greater than a predetermined length based upon the sensor data; and generating, by the processor, obstacle display data indicating a border of the plurality of obstacle in one or more of the sectors when the border length of the plurality of obstacles is greater than the predetermined length.

11. The method of claim 8, further comprising:

determining, by the processor, for each sector of the grid that includes indications of an obstacle in the sensor data, a closest edge of each obstacle in a closest block within the sector to the vehicle within the plurality of blocks of the respective sector; and generating, by the processor, obstacle display data indicating the closest edge of each obstacle in the closest block within the sector.

12. The method of claim 8, wherein the grid comprises a plurality of circles and a plurality of radial lines extending from a center of the plurality of circles.

13. The method of claim 12, wherein each sector includes the plurality of blocks between any two adjacent radial lines of the plurality of radial lines.

14. A vehicle, comprising:

a plurality of sensors configured to collect sensor data indicating when an obstacle is within a range of the vehicle, each of the plurality of sensors arranged to collect the sensor data in a different direction around the vehicle;

a display; and a processor communicatively coupled to the plurality of sensors and the display, the processor configured to:
  receive sensor data from the plurality of sensors;
  determine when a single obstacle detected in the sensor data includes a border longer than a predetermined length;
  generate obstacle display data based upon the sensor data, the obstacle display data comprising display data for each of a plurality of sectors and for each of a plurality of blocks within each of the plurality of sectors forming a grid surrounding the vehicle, the obstacle display data further indicating the border of the single obstacle in one or more of the sectors; and
  display the generated obstacle display data on the display.

15. The vehicle of claim 14, wherein the processor is further configured to:

determine, for each sector of the grid that includes indications of an obstacle in the sensor data, a closest block of the plurality of blocks of the respective sector closest to a center of the grid that includes the indications of the obstacle, wherein the processor, when generating the obstacle display data, is further configured to generate identical obstacle display data for the closest block of the plurality of blocks and each of the plurality of blocks in the respective sector of the grid further from the center of the grid than the closest block.

16. The vehicle of claim 14, wherein the processor is further configured to:

determine when a plurality of obstacles detected in the sensor data are within a predetermined distance of each other; and determine, when the plurality of obstacles detected in the sensor data are within the predetermined distance, when a border length of the plurality of obstacles is greater than a predetermined length based upon the sensor data, wherein the processor, when generating the obstacle display data, is further configured to generate obstacle display data indicating a border of the plurality of obstacles in one or more of the sectors when the border length of the plurality of obstacles is greater than the predetermined length.

17. The vehicle of claim 14, wherein the processor is further configured to:
   determine for each sector of the grid that includes indications of an obstacle in the sensor data, a closest edge of each obstacle in a closest block within the sector to the vehicle within the plurality of blocks of the respective sector,
   wherein the processor, when generating the obstacle display data, is further configured to generate obstacle display data indicating the closest edge of each obstacle in the closest block within the sector.

18. An obstacle advisory system, comprising:
   a display; and
   a processor communicatively coupled to the display, the processor configured to:
      receive sensor data from at least one sensor configured to sense obstacles around a vehicle;
      determine when a plurality of obstacles detected in the sensor data are within a predetermined distance of each other;
      determine, when the plurality of obstacles detected in the sensor data are within the predetermined distance, when a border length of the plurality of obstacles is greater than a predetermined length based upon the sensor data;
      generate obstacle display data based upon the sensor data, the obstacle display data comprising display data for each of a plurality of sectors and for each of a plurality of blocks within each of the plurality of sectors forming a grid surrounding the vehicle, wherein the processor, when generating the obstacle display data, is further configured to generate obstacle display data indicating a border of the plurality of obstacles in one or more of the sectors when the border length of the plurality of obstacles is greater than the predetermined length; and
      display the generated obstacle display data on the display.

19. A method of operating an obstacle advisory system, comprising:
   receiving, by a processor, sensor data from at least one sensor configured to sense obstacles around a vehicle;
   determining, by the processor, when a plurality of obstacles detected in the sensor data are within a predetermined distance of each other;
   determining, by the processor, when the plurality of obstacles detected in the sensor data are within the predetermined distance, when a border length of the plurality of obstacles is greater than a predetermined length based upon the sensor data; and
   generating, by the processor, obstacle display data based upon the sensor data, the obstacle display data comprising display data for each of a plurality of sectors and for each of a plurality of blocks within each of the plurality of sectors forming a grid surrounding the vehicle, the obstacle display data indicating a border of the plurality of obstacle in one or more of the sectors when the border length of the plurality of obstacles is greater than the predetermined length; and
   displaying the generated obstacle display data on a display.

20. A vehicle, comprising:
   a plurality of sensors configured to collect sensor data indicating when an obstacle is within a range of the vehicle, each of the plurality of sensors arranged to collect the sensor data in a different direction around the vehicle;
   a display; and
   a processor communicatively coupled to the plurality of sensors and the display, the processor configured to:
      receive sensor data from the plurality of sensors;
      determine when a plurality of obstacles detected in the sensor data are within a predetermined distance of each other; and
      determine, when the plurality of obstacles detected in the sensor data are within the predetermined distance, when a border length of the plurality of obstacles is greater than a predetermined length based upon the sensor data,
      generate obstacle display data based upon the sensor data, the obstacle display data comprising display data for each of a plurality of sectors and for each of a plurality of blocks within each of the plurality of sectors forming a grid surrounding the vehicle, wherein the processor, when generating the obstacle display data, is further configured to generate obstacle display data indicating a border of the plurality of obstacles in one or more of the sectors when the border length of the plurality of obstacles is greater than the predetermined length; and
      display the generated obstacle display data on the display.

* * * * *